United States Patent
Amer

(10) Patent No.: US 6,180,023 B1
(45) Date of Patent: Jan. 30, 2001

(54) COMPOSITION AND PROCESS FOR REMEDIATION OF WASTE STREAMS

(76) Inventor: Sultan I. Amer, 48323 Red Run Dr., Canton, MI (US) 48187-5435

( * ) Notice: Under 35 U.S.C. 154(b), the term of this patent shall be extended for 0 days.

(21) Appl. No.: 09/210,467

(22) Filed: Dec. 12, 1998

(51) Int. Cl.[7] ................................ C04B 2/00; C04B 7/00
(52) U.S. Cl. .......................... 252/175; 252/184; 502/400
(58) Field of Search ...................... 252/175, 184; 502/400

(56) References Cited

U.S. PATENT DOCUMENTS

| | | | |
|---|---|---|---|
| 3,428,558 | 2/1969 | Murphy | 210/59 |
| 3,617,539 * | 11/1971 | Grutsch | 210/13 |
| 3,953,330 | 4/1976 | Tonkyn et al. | 210/52 |
| 3,956,117 | 5/1976 | Bradley et al. | 210/43 |
| 3,968,036 | 7/1976 | Liles et al. | 210/15 |
| 4,167,481 | 9/1979 | Cremers et al. | 210/36 |
| 4,332,693 | 6/1982 | Piepho | 252/181 |
| 4,517,094 | 5/1985 | Beall | 210/664 |
| 5,304,710 * | 4/1994 | Kigel et al. | 588/257 |
| 5,336,704 | 8/1994 | Rainer | 524/30 |
| 5,415,808 | 5/1995 | Hasegawa et al. | 252/181 |
| 5,502,021 * | 3/1996 | Schuster | 502/400 |
| 5,882,429 * | 3/1999 | Majid et al. | 134/10 |
| 5,968,245 * | 10/1999 | Jones et al. | 106/277 |

* cited by examiner

*Primary Examiner*—David A. Simmons
*Assistant Examiner*—Betsey Morrison Hoey

(57) ABSTRACT

A remediation agent and process produces a treated water that meets discharge standards required by local regulations and generates stabilized waste which does not require further treatment prior to disposal. The composition of the treatment chemical is applicable to the treatment of industrial wastewaters and more specifically those from automobile production, metal finishing, metal processing, oil refineries, textiles, wood treatment, tannery, circuit board manufacturing, and other miscellaneous industrial waste streams from operations such as paints, coatings, adhesives, soap and detergents, chemicals, and food processing.

28 Claims, No Drawings

COMPOSITION AND PROCESS FOR REMEDIATION OF WASTE STREAMS

BACKGROUND OF THE INVENTION

1. Field of the Invention

The present invention relates to a chemical composition and its use for remediation of waste streams including those from municipal and industrial sources containing high levels of contaminants such as fat, oil, grease, soluble and insoluble heavy metals, organic matter and inorganic matter. The composition includes natural minerals such as clay, zeolites, apatite, Dolomitic lime, fly ash, cement, coagulants, and flocculants which are either cationic, anionic or non-ionic in nature.

2. Description of Prior Developments

Waste streams generally contain contaminants such as fat, oil, grease, heavy metals, organic substances such as phenolics, chlorinated compounds, and inorganics such as fluoride, sulfate, phosphate, cyanide, chromates, arsenic and selenium, at levels considered hazardous to the environment and which could pose a risk to public health. Such contaminants must be removed or their levels reduced to meet government discharge standards prior to discharging the waste into the environment.

Waste streams are generally treated by chemical, physical or mechanical means, or by combinations thereof. Techniques used in conventional wastewater treatment for removing emulsified soluble or floating oils, suspended solids, heavy metals, organic and inorganic matters basically involve several steps such as demulsification, oil skimming, metal precipitation, flocculation, and settling. Each step takes place in a separate tank and the entire treatment requires multiple adjustments of pH and the addition of acid, emulsion breakers (demulsifiers), lime/caustic, coagulants, and polymer solutions.

This conventional multi-step process is time consuming and has a high demand for equipment, i.e., it requires a number of treatment tanks equipped with agitators, pumps, liquid chemical dispensers and feed lines, chemicals, manpower, and energy. In each step, wastewater may be recirculated several times for retreatment to effect the maximum removal of contaminants, before it goes to the next step.

Moreover, the generated solid waste typically contains high levels of heavy metals and other hazardous substances which are usually leachable. The waste therefore requires further treatment to render the solid waste non-hazardous before it can be safely disposed. The cost of the disposal of hazardous waste is three to four times the disposal cost of nonhazardous waste.

The use of chemical agents for treating wastewater is disclosed in U.S. Pat. Nos. 3,956,117, 3,428,558, 3,968,036, 4,167,481, 4,517,094, 5,336,704, and 5,415,808. These earlier inventions, however, suffer from disadvantages relating to their limited applications, i.e., the chemical agents are not stand-alone products. For example, U.S. Pat. No. 3,956,117 discloses the use of cationic polymers for removal of oil; U.S. Pat. Nos. 3,428,558, and 5,415,808 disclose polymeric flocculants and their use in the removal of suspended particles; U.S. Pat. Nos. 4,167,481 and 5,336,704 disclose chemical compositions for removal of metals; and U.S. Pat. Nos. 3,968,036 and 4,517,094 disclose methods for removal of organics.

None of these earlier inventions discloses a single agent or composition that is capable of simultaneous removal of contaminants such as oil and grease, suspended solids, heavy metals, and other organic and inorganic matter. Moreover, in most cases, prior treatment processes are also tedious and laborious such as those disclosed in U.S. Pat. Nos. 4,167,481 and 4,517,094 or those inventions wherein a conventional multi-step process is required when polymeric flocculants are used. Most importantly, these earlier inventions are not cost effective and generate solid wastes that are normally hazardous and must be further treated prior to disposal.

More recently, attention has been focused on the development of a single product system for treatment of waste streams, such as disclosed in U.S. Pat. Nos. 3,953,330, 4,332,693, 4,415,467, and 4,765,908. These products suffer from disadvantages due to non-versatility, i.e., they are generally applicable to a specific type of waste stream, e.g., oil, metals, or organic contaminated waste streams. Moreover, their manufacturing processes are complex, the compositions work in a narrow range of pH, they are slow to react with contaminants, and they produce solid waste that may not pass the Toxicity Characteristic Leaching Procedure test (TCLP) instituted by the US EPA. These products also do not work well in the presence of chelating and complexing agents, they usually require a pretreatment step to break the chelate or a post treatment step with a polishing agent, and they are costly to use on a commercial scale.

Accordingly, what is needed is an economical single treatment agent or chemical composition for remediation of waste streams, and more particularly industrial waste streams, which is capable of simultaneously and efficiently removing up to several thousand ppm of fat, oil, grease, suspended solids, soluble and insoluble heavy metals, and other organic and inorganic matters, resulting in treated water that meets discharge standards set by environmental authorities.

A further need exists for such a single treatment agent which leads to the formation of a fast settling floc that is easily dewatered.

A further need exists for a process that removes hazardous contaminants from a waste stream and isolates them in a stabilized non-leaching matrix.

A further need exists for such an agent and process which generates solid waste that does not require further treatment in order to pass the TCLP test and does not pose a hazard to the environment once disposed in a landfill.

A further need exists for such a composition that is very versatile and works effectively over a wide pH range of, e.g. 2–12, and has an uptake capacity that is independent of the presence of surfactants, detergents, hardness, and chelating/complexing agents.

A further need exists for such a composition which produces a non-slimy sludge which does not block or clog sludge filters such as filter presses.

SUMMARY OF THE INVENTION

The present invention has been developed to meet, and does in fact meet, the needs noted above and therefore has as an object the provision of a single-composition, simultaneous-process for the treatment of wastewater that can be carried out in either a batch process or in a continuous process. In a batch process, a single treatment tank is sufficient and the treatment agent can be added manually or through a dry powder feeder. Addition of a settling tank may enhance the efficiency of the sedimentation process when treating large volumes of water.

Synergistic effects, brought about by the various components of the treatment composition, enhance the reaction rate between the composition and contaminants in the waste stream. Such effects are fully utilized in the continuous process such that the treatment can handle the incoming waste streams at flow rates as high as 1000 gal/min. The treatment composition can be fed continuously at a predetermined feed rate using automated feed equipment.

The sludge can be dewatered via a filtration system such as a vacuum filtration system, a centrifuge, and most preferably a filter press which is simple and relatively easy to maintain. Treated water is drained off and released or recycled for reuse and the solid waste is hauled away without the need for further treatment.

A further object of this invention is to provide a treatment technology that produces high quality treated water suitable for reuse in manufacturing processes without the high cost of utilizing membrane separation technology or other technologies.

A treatment agent for the remediation of waste streams has been developed in accordance with this invention for simultaneously removing virtually all contaminants in the waste stream. Contaminants removed by the treatment agent include fats, oil, grease, other organic matters, suspended solids, and soluble heavy metals which exist as positive ions such as aluminum, cadmium, chromium, cobalt, copper, iron, lead, manganese, mercury, nickel, silver, tin, titanium, zinc as well as radioactive elements such as uranium, thorium, and plutonium.

In addition, the treatment agent and process according to the invention are effective in removing negative ions such as sulfate, fluoride, phosphate, hexavalent chromium, arsenic and selenium. Furthermore, the compositions of this invention are effective in lowering the levels of chemical oxygen demand (COD) and biological oxygen demand (BOD) in waste streams.

The chemical composition of the present invention can include natural aluminosilicates such as natural clays, and a blend of natural and synthetic minerals which includes natural clay, Dolomitic lime, cement, fly ash and phosphate rocks. The chemical composition of the present invention can further include, individually, zeolites, Dolomitic lime, apatite, cement, and fly ash. Additional components can include coagulating agents which are either organic, inorganic or combinations thereof, and flocculating agents which are either cationic, anionic, nonionic or combinations thereof. These ingredients work synergistically to enhance the reactions kinetics between the contaminants in the waste stream and the treatment agent, leading to an increased uptake capacity, up to several thousands of ppm, and formation of a highly stabilized waste which typically requires no further treatment in order to pass the TCLP test. The nature of contaminants present in the various waste steams and their concentrations may vary widely from case to case and therefore the percentage of each component in the composition is determined and adjusted accordingly within the scope of this invention.

Treatment agents of the present invention are very cost effective and react quickly to remove contaminants from wastewater. Such use produces a high-quality treated effluent that meets discharge standards or requirements for reuse, and also produces a stabilized solid waste. With the treatment compositions of the present invention, the treatment process, which previously has generally been a multi-step process, is now reduced to a single step and requires fewer treatment vessels and only one dispenser to deliver the treatment composition.

The treatment composition of this invention is also effective over a wide waste stream pH range, i.e., 2–12, and therefore in most applications initial and post treatment pH adjustments are not required. Additionally, the reaction between the composition of the present invention and contaminants in the waste stream is independent of the presence of chelating and/or complexing agents and, accordingly, use of polishing agents such as sulfides, dithiocarbamates and other noxious chemicals or the application of a pretreatment to break the chelate is no longer necessary.

Due to the fast reaction rate of the present treatment process and the high capacity of the treatment agents in taking up and immobilizing contaminants, a continuous treatment process can handle waste streams having flow rates as high as 1000 gal/min. Furthermore, the process of the present invention is simple and relatively inexpensive which makes it possible and affordable for small operators to set up their own treatment systems. This, in turn, reduces the demand put on treatment facilities such as publicly owned treatment works (POTW), and waste and waste treatment plants.

In summary, the present invention provides:
1. An efficient process for remediation of waste streams, particularly wastewater and groundwater;
2. Stand-alone compositions for the simultaneous uptake of oil and grease, metals, organics, phosphorus, fluoride, and suspended solids present in waste streams, and particularly industrial waste streams;
3. A process and compositions that work over a wide pH range, i.e., 2 to 12;
4. A fast treatment process that can handle flow rates up to 1000 gallons per minute in a continuous setup;
5. Formation of a dense floc that is fast settling and easy to dewater, resulting in a compact small volume of solid water;
6. A process that generates solid waste that passes the TCLP test;
7. Treated water that meets government discharge standards;
8. Treated water of high quality that can be reused in manufacturing processes; and
9. A wastewater remediation process which is very economical.

The aforementioned objects, features and advantages of the invention will, in part, be pointed out with particularity, and will, in part, become obvious from the following more detailed description of the invention.

DETAILED DESCRIPTION OF THE PREFERRED EMBODIMENTS

The present invention is directed to treatment compositions and to a treatment process for the remediation of waste streams and, more particularly, industrial waste streams, without the need for the addition of other chemicals. The treatment agents according to this invention are preferably provided in a solid homogeneous powdered form which is easily dispensed via manual measurement or automatically metered into a treatment tank in either a batch or continuous treatment process. With efficient mixing, i.e., vigorous mixing, the treatment agent is easily dispersed such that it interacts instantly with contaminants in the waste stream.

One form of the treatment composition includes, by weight percent, 5 to 85% of natural clays, a blend of natural and synthetic minerals, (such as clay, zeolite, fly ash, cement, fumed silica cement and pulverized phosphate rocks), or combinations thereof; 5 to 85% of cement such as Portland cement, 2 to 23% of fly ash; 2 to 40% of a pulverized natural phosphate rock such as appetite selected from a group of hydroxyapatite, fluorapatite, and/or chlorapatite or combinations thereof; 5 to 58% of Dolomitic lime; 0 to 40% of either organic coagulants selected from a group of low molecular weight cationic polyelectrolytes such as polyamine, polydiallyldimethylammonium chloride, and polyepichlorohydrin, etc., or inorganic coagulants selected from a group of aluminum or iron containing compounds, or combinations of the organic and inorganic coagulants; and 0.2 to 5.5% of flocculating agents such as anionic, nonionic, cationic polymers, or combinations thereof. The amounts stated in the composition are based on the total weight of the composition.

The mineral blend includes from 30 to 75% w/w of natural clay, from 5 to 45% w/w of Dolomitic lime, from 5 to 30% w/w of cement and from 0.8 to 7.5% w/w of fly ash. This blend can be substituted for or combined with the natural clays and zeolites noted above as long as the overall limits on each constituent are maintained as specified. The natural clay in the mineral blend is selected from bentonite, zeolites and natural phosphate rocks, and the cement is preferably a blend of oxides of Si, Al, Fe, Mg, Ca, Mn, Na, and silicon, aluminum, iron, manganese, alkaline earth and alkali metals.

Coagulants suitable for this invention are inorganic, organic, or combinations thereof. Inorganic coagulants include iron and aluminum containing compounds such as sodium aluminates, aluminum chlorhydrate, polyaluminum chloride, aluminum sulfate, ferric chloride, ferrous sulfate, and ferric sulfate. Organic coagulants include polymeric materials such as polyamine, polydiallyldimethylamonium chloride, and polyamine epichlohydrin.

Preferred polymeric flocculating agents include high molecular weight anionic, nonionic, cationic polyelectrolytes, or combinations thereof. The nonionic polyelectrolytes are selected from a group consisting of hydrolyzed polyacrylonitrile, polyacrylamide, and acrylamide/acrylonitrile copolymer. The preferred anionic polyelectrolytes are polyacrylamide/acrylate, maleates, methacrylates, sulfonates, and 2-acrylamido-2-methylpropane sulfonate copolymers. The preferred cationic polyelectrolytes are acrylamide copolymers of dimethyldiallyammonium chloride, dialkyl aminoethyl acrylate or methacrylate quarternized with dimethylsulfate or methyl chloride, and methacrylamidopropyltrimethylammonium chloride or a combination thereof, and preferably polyelectrolytes of high molecular weight and most preferably polyelectrolytes of a molecular weight above 5 million. A preferred treatment agent includes:

a. From 15 to 60% of natural clays, zeolites, a natural mineral blend, or combinations thereof;
b. From 15 to 65% of cement.
c. From 3 to 15% of fly ash, silica fume or a mixture thereof.
d. From 8 to 28% of hydroxyapatite, fluorapatite, chlorapatite, or combinations thereof.
e. From 7 to 45% Dolomitic lime.
f. From 0 to 28% inorganic, organic coagulants or combinations thereof.
g. From 0.5 to 2.5% flocculating agents selected from a group which consists of anionic, nonionic, cationic agents, or combinations thereof.

It should be noted that fly ash and fumed silica (silica fume) are directly interchangeable and can be substituted for one another in equal amounts. Moreover, natural clay and pulverized phosphate rocks are also interchangeable and can be substituted for one another on a one for one basis.

The following examples will further illustrate the preparation and performance of the preferred compositions in accordance with the present invention. However, it is to be understood that these examples are given by way of illustration and not limitation. In these examples, parts means parts by weight, unless otherwise noted.

EXAMPLE I

A mixture of 50 parts natural clay, 20 parts aluminum sulfate, 13.5 parts Dolomitic lime, 0.75 part cationic polyelectrolyte, i.e., polydiallyldimethylammonium chloride, 12.3 parts of cement and 3.7 parts of fly ash was mixed in a powder mixer. The ingredients were added one at a time and were mixed thoroughly and homogeneously before each addition. The finished product is a fine, homogeneous, and free flowing solid.

The composition of Example 1 was used at 0.05% by wt. to treat a wastewater sample from an automotive manufacturer. The results are shown in Table 1 below.

TABLE 1

Treatment Performance of Waste Stream from an Automotive Manufacturing Operation

| Parameter | Local discharge limit, mg/L | Before, mg/L | Example 1 at 0.05% mg/L |
|---|---|---|---|
| Oil & Grease | 50.0 | 32000.0 | 24.0 |
| Suspended solids | NA | 532.0 | 10.0 |
| Total phosphorus | NA | 14.7 | 1.3 |
| COD | NA | 2000.0 | 608.0 |
| Phenol | 0.200 | 8.100 | 0.080 |
| Cadmium | 0.370 | 1.350 | ND |
| Chromium | 1.470 | 73.200 | ND |
| Copper | 1.800 | 51.800 | ND |
| Lead | 0.370 | 1.300 | ND |
| Nickel | 2.120 | 230.000 | 0.166 |
| Silver | 0.370 | <1 | ND |
| Zinc | 1.390 | 1203.000 | 0.160 |
| pH | 5–10.5 | 6.8 | 7.8 |

NA - not available
ND - not detectable

TABLE 2

Treatment Performance of Prior Known Agents in Industrial Wastewaters

| Parameter | Wastewater 1 mg/L | Treated with Agent 1 (0.45%) mg/L | Treated with Agent 2 (0.45%) Mg/L | Wastewater 2 mg/L | Treated with Agent 3 (0.45%) mg/L |
|---|---|---|---|---|---|
| Oil & Grease | 752.0 | 24.0 | 70.0 | 204.0 | 66.0 |
| Total Phosphorus | 18.400 | 0.170 | 0.121 | 14.031 | 0.300 |
| PH | 6.8 | 6.9 | 6.8 | 6.9 | 7.5 |

EXAMPLE II

A mixture of 40 parts natural clay, 26.6 parts Dolomitic lime, 14 parts fly ash cement, 18 parts pulverized phosphate rock and 1.6 parts acrylate copolymer was mixed in a powder mixer in the same manner as in EXAMPLE I. The finished product is a fine, homogeneous, and free flowing solid.

The composition of Example 2 was used at 0.07% by weight to treat the waste stream from a metal finishing operation as shown in Table 3.

TABLE 3

| Parameter | Before, mg/L | After, mg/L |
|---|---|---|
| BOD | 258.0 | 35.9 |
| Suspended solids | 373.0 | 17.0 |
| Total phosphorus | 71.40 | 0.6 |
| Arsenic | <0.15 | ND |
| Cadmium | <0.05 | ND |
| Chromium | 431.700 | 0.250 |
| Copper | 10.800 | ND |
| Iron | 253.000 | 1.390 |
| Lead | <0.1 | ND |
| Mercury | <0.0002 | ND |
| Nickel | 15.300 | 0.070 |
| Silver | <0.05 | ND |
| Zinc | 582.0 | 0.57 |
| pH | 8.0 | 9.5 |

The composition of Example 2 was further used at 0.2% by weight to treat a wastewater from a cathode ray tube (CRT) manufacturing operation. This treatment composition is capable of taking up anionic species such as fluoride besides metallic contaminants as shown in Table 4. The treated water is of a high quality for immediate recycling and reuse in the manufacturing process.

TABLE 4

Treatment performance of waste stream from a cathode ray tube manufacture

| Parameter | Local Discharge Limit, mg/L | Before, mg/L | After, mg/L |
|---|---|---|---|
| BOD | 60 | 12.4 | <5 |
| COD | 400 | 234.0 | <5 |
| Total dissolved solids | 5000 | 3923.0 | 1250.0 |
| Suspended solids | 150 | 62.1 | 5.8 |
| Hexavalent Chromium | 0.25 | 24.900 | ND |
| Trivalent Chromium | 0.75 | 5.690 | <0.05 |
| Aluminum | NA | 11.100 | <0.5 |
| Copper | 2 | 0.170 | <0.02 |
| Fluoride | 5 | 16.500 | 2.350 |
| Iron | NA | 1.700 | <0.05 |
| Lead | 0.2 | 0.220 | <0.1 |
| Nickel | 1 | 0.430 | <0.02 |
| Zinc | 5 | 2.8 | <0.01 |
| pH | 5.5–9.0 | 5.9 | 8.9 |

EXAMPLE III

The composition of Example 2 was used at 0.20% mg/L to treat the waste stream from an electroplating operation. Results of treated water and solid waste (filter cake) are shown in the following Table 5 and Table 6.

TABLE 5

Treatment performance of waste stream from an electroplating operation.

| Parameter | Before, mg/L | After, mg/L |
|---|---|---|
| Chromium | 160.0 | 0.38 |
| Copper | 60.0 | 0.25 |
| Nickel | 35.0 | 0.08 |
| Zinc | 3000.0 | 0.53 |

TABLE 6

Analytical results of contaminants in filter cake

| Parameter | TCLP Limits mg/L | Concentration in filter cake, mg/kg | Leachate mg/L |
|---|---|---|---|
| Chromium | 5.0 | 1840.0 | 0.13 |
| Copper | 100.0 | 690.0 | 0.19 |
| Nickel | NR | 400.0 | 0.12 |
| Zinc | 500.0 | 34500.0 | 10.20 |

EXAMPLE IV

A mixture of 57 parts natural clay, was added to 20 parts of Dolomitic lime, 9.24 parts of cement, 2.76 parts of fly ash, and 10 parts of polyamine (an organic coagulant), and 1 part polyacrylamide mixed in a powder mixer in the same manner as in EXAMPLE I. The finished product is a fine, virtually homogeneous, and free flowing solid for use in treating wastewater.

It should be noted that the core of the invention is based on the use of one or more powdered natural silicates such as aluminosilicates which include natural clays and zeolites in combination with fly ash and/or silica fume, cement, and Dolomitic lime. These four basic constituents when combined in sufficient amounts are effective to provide the results discussed above.

It should be noted that natural silicates may be provided in virtually any form of commercial product and need not be further treated as is often the case in prior processes and compositions for waste stream treatment. Fly ash, silica fume, and cement may be mixed separately or provided in a commercially available mixed form known as fly ash cement and silica fume cement. This combined product should meet the weight requirements for both silica fume/fly ash and cement as specified above.

A particularly important component of the treatment composition is Dolomitic lime. Although ordinary lime functions adequately, Dolomitic lime is preferred.

Once these basic constituents are combined, i.e., natural silicates, fly ash and/or silica fume, cement and Dolomitic lime, the additional constituents individually or in the combinations noted above provide further improved performance in the treatment of waste streams. A particularly effective treatment composition has been found to include by weight percent, from 5 to 85% natural silicate, from 5 to 85% cement, from 2 to 23% fly ash; from 5 to 58% Dolomitic lime; from 0 to 40% coagulant; from 0.2 to 5.5% flocculating agent, and from 2 to 40% phosphate rock.

The treatment compositions noted above may be used in both batch and continuous treatment processes by adding from 0.01 g/L to 10 g/L of the treatment composition to a treatment tank, mixing the composition with the waste stream in the treatment tank and forming a sludge from the waste stream. The sludge is formed by a non-slimy floc which does not easily clog filters such as sand filters and filter presses.

Batch processes typically require mixing the composition and waste stream over a period of about 1 to 15 minutes. A floc is quickly formed which then forms a highly stabilized sludge that can be filtered, dried and disposed as a solid waste in a landfill without further treatment insofar as the waste passes the TCLP test and the treated water can be immediately reused or drained into a sewer since it meets all governmental environmental requirements.

In a continuous process, a floc is formed in a clarifier and the overflow from the clarifier can be drained directly into a sewer. The resulting sludge can be removed from the clarifier and dewatered, and is so well stabilized that it can, without further treatment, be legally disposed in a landfill. The composition can effectively treat waste streams flowing at up to 1000 gallons per minute.

Using either a batch or continuous process, the treatment composition formulated according to the teachings above can remove a very wide range of contaminants. Such contaminants include oil and/or grease present in the waste stream in amounts up to 150,000 ppm, heavy metals including aluminum, cadmium, chromium (III), cobalt, copper, iron, lead, manganese, mercury, silver, tin, titanium, zinc and radioactive metals including plutonium, uranium and thorium. Further, such contaminants include fluoride, phosphate, chromium (VI), arsenic and selenium in anionic form. All of the above contaminants can be removed from municipal wastewater, industrial wastewater, contaminated ground water and concentrated liquors in accordance with the invention.

There has been disclosed heretofore the best embodiment of the invention presently contemplated. However, it is to be understood that various changes and modifications may be made thereto without departing from the spirit of the invention.

What is claimed is:

1. A composition for the remediation of waste streams, comprising an effective amount of the following to remove contaminants from said waste streams:
   one or more natural silicates;
   one or more of fly ash and silica fume;
   cement; and
   Dolomitic lime.

2. The composition of claim 1, wherein said silicates comprise an aluminum silicate.

3. The composition of claim 2 wherein said aluminum silicate comprises natural clay.

4. The compositions of claim 2, wherein said aluminum silicate comprises zeolite.

5. The composition of claim 1 further comprising up to 28% by weight of an inorganic coagulant.

6. The composition of claim 1, wherein said composition comprises from 15 to 60% by weight of said natural silicates.

7. The composition of claim 1 wherein said composition comprises from 15 to 65% by weight of said cement.

8. The composition of claim 1, wherein said composition comprises from 3 to 15% by weight of said one or more of fly ash and silica fume.

9. The composition of claim 1, further comprising from 8 to 28% of pulverized natural phosphate rock.

10. The composition of claim 9, wherein said natural phosphate rock comprises one or more rocks selected from the group consisting of hydroxyapatite, flourapatite, and chlorapatite.

11. The composition of claim 1, further comprising up to 28% by weight of an organic coagulant.

12. The composition of claim 1, further comprising a flocculating agent.

13. The composition of claim 12, wherein said composition comprises from 0.2 to 5.5% by weight of said flocculating agent.

14. The composition of claim 12, wherein said flocculating agent comprises one or more agents selected from the group consisting of anionic polymers, nonionic polymers and cationic polymers.

15. A composition for the remediation of waste streams, comprising an effective amount by weight percent of the following to remove contaminants from said waste streams; from 5 to 85% natural silicate; from 5 to 85% cement; from 2 to 23% fly ash and/or silica fume; from 5 to 58% lime; from 0 to 40% coagulant; from 0.2 to 5.5% flocculating agent; and from 2 to 40% pulverized phosphate rock.

16. The composition of claim 15, wherein said fly ash and/or silica fume and said cement provided are in the form of fly ash cement and/or silica fume cement.

17. The composition of claim 15, wherein said natural silicate comprises one or more aluminosilicates selected from the group consisting of natural clay and zeolite.

18. The composition of claim 15 wherein said coagulant comprises one or more coagulants selected from the group consisting of inorganic coagulants and organic coagulants.

19. The composition of claim 18, wherein said inorganic coagulants comprise iron compounds and aluminum compounds.

20. The composition of claim 18, wherein said organic coagulants comprise low molecular weight cationic polyelectrolytes.

21. The composition of claim 15 wherein said lime comprises Dolomitic lime.

22. The composition of claim 21, wherein said phosphate rock comprises one or more apatites selected from the group consisting of hydroxyapatite, chlorapatite, and fluorapatite.

23. The composition of claim 15, wherein said coagulant comprises one or more coagulants selected from the group consisting of ferrous sulfate, ferric chloride, aluminum chlorhydrate, polyaluminum chloride and sodium aluminate.

24. The composition of claim 15 wherein said coagulant comprises one or more coagulants selected from the group consisting of polyamine, polydiallyldimethylamoniuim chloride, and poly epichlohydrin.

25. The composition of claim 15, wherein said flocculating agent comprises one or more polyelectrolytes selected from the group consisting of nonionic, anionic and cationic polyelectrolytes.

26. The composition of claim 15 wherein said flocculating agent comprises one or more polyelecyrolytes selected from the group consisting of hydrolyzed polyacrylonitrile, polyacrylamide, acrylamide/acrylonitrile copolymer, acrylamide copolymers of acrylates, methacrylates, vinyl suflonate, styrene sulfonate, and 2-acrylamido-2-methylpropane sulfonate.

27. The composition of claim 15, wherein said flocculating agent comprises one or more cationic polyelectrolytes selected from the group consisting of acrylamide copolymers of dimehtyldiallylammonium chloride, dialkyl aminoethyl acrylate or methacrylate quarternized with dimethylsulfate or methyl chloride, and methacrylamidopropyltrimethylammonium chloride.

28. The composition of claim 25, wherein said polyelectrolytes comprise a molecular weight above 5 million.

* * * * *